H. D. ESTES.
POWER TRANSMISSION ATTACHMENT FOR AUTOMOBILES.
APPLICATION FILED APR. 7, 1917.

1,273,470.

Patented July 23, 1918.

WITNESSES

INVENTOR

H. D. Estes,

BY Victor J. Evans

ATTORNEY

H. D. ESTES.
POWER TRANSMISSION ATTACHMENT FOR AUTOMOBILES.
APPLICATION FILED APR. 7, 1917.
1,273,470.
Patented July 23, 1918.
2 SHEETS—SHEET 2.
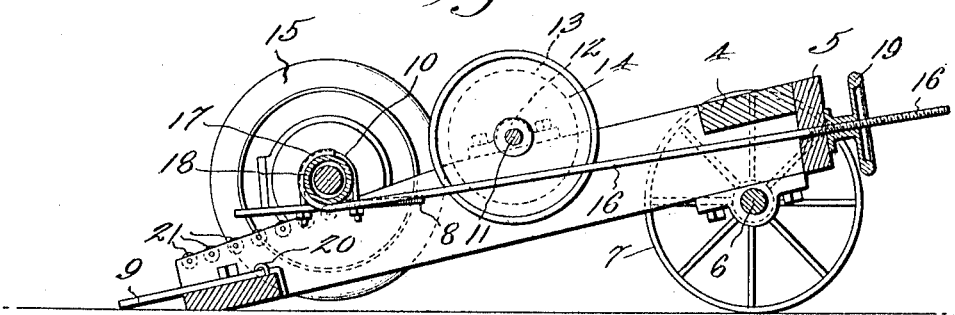
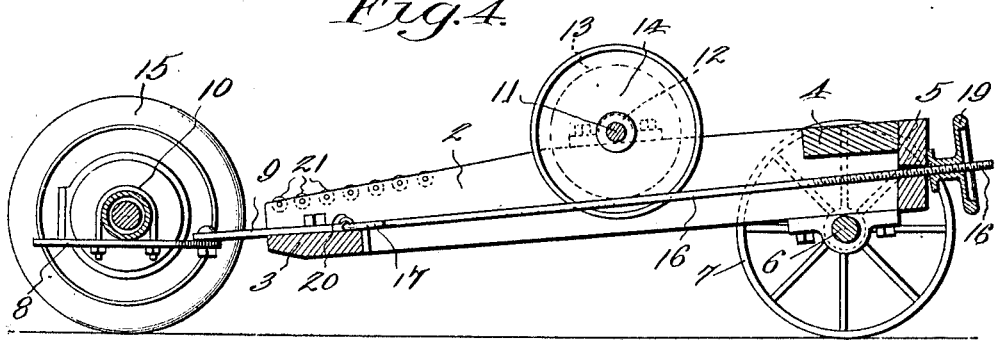
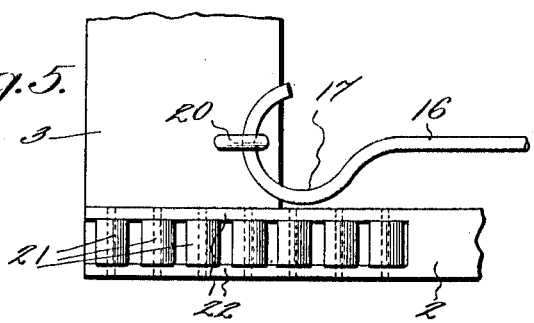
WITNESSES
INVENTOR
H.D.Estes,
BY Victor J. Evans
ATTORNEY

UNITED STATES PATENT OFFICE.

HENRY D. ESTES, OF HARTFORD, KENTUCKY, ASSIGNOR OF ONE-HALF TO ULYSSES S. CARSON, OF HARTFORD, KENTUCKY.

POWER-TRANSMISSION ATTACHMENT FOR AUTOMOBILES.

1,273,470.                Specification of Letters Patent.      Patented July 23, 1918.

Application filed April 7, 1917. Serial No. 160,522.

*To all whom it may concern:*

Be it known that I, HENRY D. ESTES, a citizen of the United States, residing at Hartford, in the county of Ohio and State of Kentucky, have invented new and useful Improvements in Power-Transmission Attachments for Automobiles, of which the following is a specification.

This invention comprehends improvements in power transmission attachments for automobiles and relates especially to a device which may be frictionally engaged with the rear wheels of an automobile to receive power therefrom and drive a pulley thus making it possible for farmers to operate various farm implements.

One of the objects of the invention is to provide a power transmission attachment including a truck upon the side bars of which the rear axle of an automobile may be supported while furnishing power to the device.

Another object of the invention is to generally improve friction driven power apparatus of this type to render it more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Fig. 3 is a longitudinal sectional view of the same.

Fig. 4 is a similar view showing the device in trailing position.

Fig. 5 is a fragmentary plan view of the device.

Figure 1:
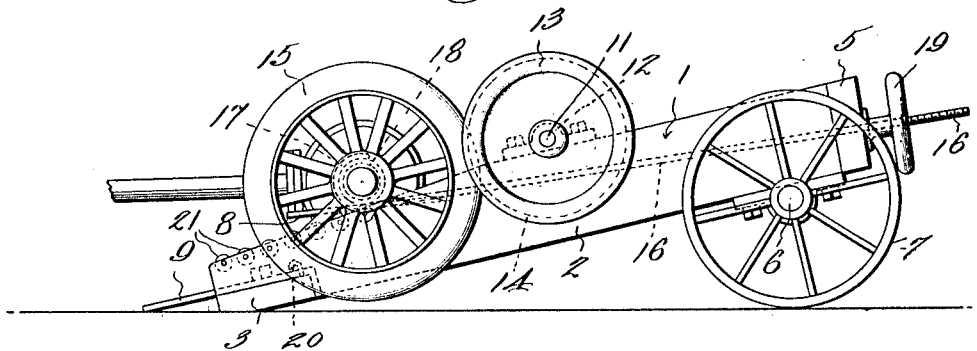
Figure 1 is a side elevation of my attachment showing the same in use.
Figure 2:
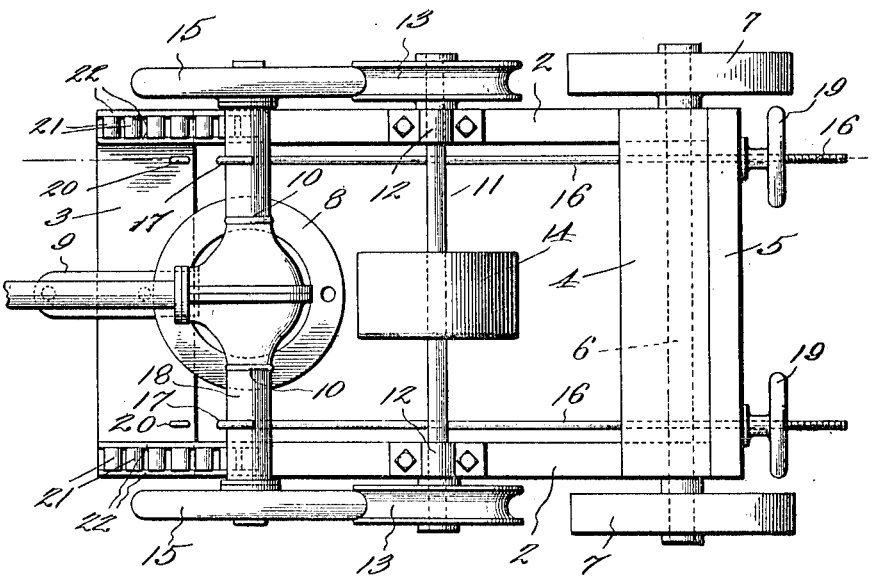
Fig. 2 is a top plan view of the device in use.

Referring in detail to the drawings by numerals, 1 designates as an entirety a truck frame having side bars 2, a front cross bar 3 and rear cross bars 4, 5. The rear end of the frame is mounted upon an axle 6 having wheels 7 and the front end of the frame may be connected to a coupling member 8 by means of the tongue 9. The coupling ring or member 8 is secured to the axle by yokes 10 and may be left there at all times as it does not interfere in any way with the proper operation of the device.

A shaft 11 journaled transversely of the frame through the bearings 12, is provided with a pair of friction drive wheels 13 and a pulley 14.

The drive wheels may be driven by the rear wheels 15 of an automobile and the automobile wheels may be drawn into the proper operative engagement with the friction wheels 13 by a pair of draw rods 16 having hooks 17 formed on their forward ends for engagement with the axle 18 of the machine. The draw rods are threaded adjacent their rear ends, extend slidably through the cross piece 5 and have mounted thereon in threaded engagement therewith, the hand wheels 19. When the draw rods are not in use, they are connected to the hooks or studs 20 on the cross bar 3 and are held in an out of the way position thereby, so as not to interfere with the progress of the truck when trailing behind the machine.

A plurality of rollers 21 may be mounted in channels 22 formed in the upper edges of the side bars 2 adjacent their forward ends so as to form roller tracks for the axle 18 when it is being moved toward or away from the friction drive wheels 13.

When it is desired to operate the power attachment, it is disconnected from the machine and its forward end is lowered into contact with the ground to incline the side bars 2. Now the machine may be backed toward the attachment and if driven rearwardly with a little speed, its momentum will carry its rear axle up the side bars of the truck over the rollers 21 into engagement with the friction drive wheels 13. It may be held in operative position by the draw rods 16. Or if the momentum of the machine does not suffice to contact its rear wheels with the drive wheels 13 they may be drawn into such contact by the draw rods 16 as will be clearly understood. Now when the engine of the automobile is started, the rear wheels of the auto will drive the friction wheels 13 of the power attachment and the pulley 14 will be rotated so as to furnish power to a belt for driving any desired implement or apparatus.

To disconnect the machine, it is only necessary to release the axle 18 from the draw rods, whereupon said axle will slide down the inclined frame bars 2 to bring the wheels 15 in engagement with the ground.

From the foregoing description taken in connection with the accompanying drawings, it will be apparent that I have provided a very simple, practical and efficient power transmission attachment for automobiles which may be easily operatively engaged with the automobile with the use of but very little energy and which when not in operation may be secured to the automobile to trail therebehind.

While I have shown and described the preferred embodiments of my invention, it will be clearly understood that I do not wish to be limited to this construction, but make such changes as will fall within the scope and spirit of the invention as claimed.

What I claim is:

A portable power transmission machine for automobiles, comprising a truck frame, wheels supporting one end only of said frame, the other end of the frame being adapted to rest on the ground to dispose the frame in an inclined position, the side bars of said frame being formed with longitudinal channels, rollers journaled in said channels, a power shaft journaled transversely in the frame, friction wheels fast on said power shaft, and means on said frame for pulling the rear axle housing of an automobile toward the power shaft until the driving wheels of the automobile are in frictional engagement with the friction wheels of the power shaft, said rollers being positioned to support said rear axle housing as it is moved toward the power shaft.

In testimony whereof I affix my signature.

HENRY D. ESTES.

Copies of this patent may be obtained for five cents each, by addressing the "Commissioner of Patents, Washington, D. C."